United States Patent [19]
Nien

[11] Patent Number: 6,081,940
[45] Date of Patent: Jul. 4, 2000

[54] NON-FLUSHING TOILET

[76] Inventor: Chin-Fu Nien, No. 24, Mintzu St., Yuli Je, Hualien 981, Taiwan

[21] Appl. No.: 09/330,454

[22] Filed: Jun. 11, 1999

[51] Int. Cl.[7] .................................................. A47K 11/02
[52] U.S. Cl. ............................... 4/449; 4/111.1; 4/111.2; 4/111.5; 4/111.6; 4/484
[58] Field of Search .......................... 4/449, 111.1, 111.2, 4/111.3, 111.4, 111.5, 111.6, DIG. 12, 484, 319, 320, DIG. 19; 210/178, 179, 532.1, 532.2

[56] References Cited

U.S. PATENT DOCUMENTS

| | | | |
|---|---|---|---|
| 2,768,386 | 10/1956 | Graef et al. | 4/111.2 |
| 3,665,522 | 5/1972 | Backlund et al. | 4/484 |
| 3,693,193 | 9/1972 | May | 4/484 |
| 3,908,336 | 9/1975 | Forslund | 4/484 |
| 4,254,515 | 3/1981 | Kiyama et al. | 4/449 |
| 4,519,104 | 5/1985 | Nilson | 4/484 |
| 4,521,304 | 6/1985 | Yount | 4/111.1 |
| 4,999,857 | 3/1991 | Mohrman | 4/111.1 |
| 5,068,926 | 12/1991 | Suzuki | 4/111.5 |
| 5,261,126 | 11/1993 | Kishi | 4/111.5 |
| 5,778,290 | 3/1999 | Nian | 4/111.1 |
| 5,832,623 | 11/1998 | Nagumo et al. | 4/111.1 |
| 5,901,385 | 5/1999 | Nian | 4/484 |

*Primary Examiner*—Steven O. Douglas
*Assistant Examiner*—Khoa D. Huynh
*Attorney, Agent, or Firm*—Raymond Y. Chan; David and Raymond

[57] ABSTRACT

An excrement treating machine of a non-flushing toilet comprises a housing, a breaking and separating mechanism, a power driving unit, and a conveyer device. The housing is provided at the top thereof with a toilet seat provided with an excrement bag for collecting excrement. The excrement bag containing the excrement is dropped into the excrement treating machine in which the excrement bag and its contents are cut and broken into pieces, which are transported to the collection containers in which the excrement pieces are dehydrated to become an organic fertilizer. The entire treatment process makes no use of water.

2 Claims, 3 Drawing Sheets

NON-FLUSHING TOILET

FIELD OF THE PRESENT INVENTION

The present invention relates generally to a toilet, and more particularly to an excrement treating machine for use in the non-flushing toilet. The excrement treating machine is used to treat the human excrement in such a way that the excrement does not pollute the environment.

BACKGROUND OF THE PRESENT INVENTION

The conventional flush toilet consumes a great deal of water. As a result, the water consumption of the conventional flush toilet has become a problem of water conservation. In addition, the problem of water pipes supplying the water to the conventional flush toilet can be rather expensive to deal with. Furthermore, the excrement collected by the conventional flush toilet is generally treated in a septic tank in which the excrement is putrefied and decomposed through the bacterial action. The public mobile toilet has the problems of water supply and collection of excrement in quantity.

SUMMARY OF THE PRESENT INVENTION

The primary objective of the present invention is to provide an excrement treating machine for use in the non-flush toilet. The excrement treating machine is capable of treating the excrement without the use of water.

It is another objective of the present invention to provide a non-flush toilet for use in the public mobile toilet which does not have an easy access to water.

It is another objective of the present invention to provide a non-flush toilet with an excrement treating machine capable of decomposing the excrement such that the decomposed excrement does not pollute the environment, and that the decomposed excrement is transformed into the utilizable organic matters.

DETAILED DESCRIPTION OF THE PREFERRED EMBODIMENT

Figure 1:
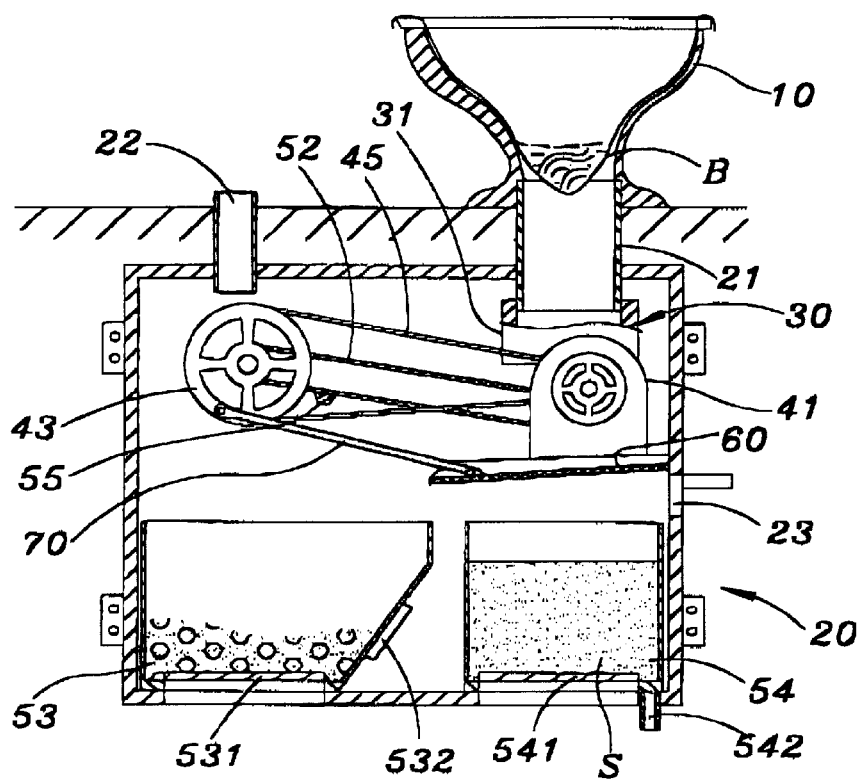
FIG. 1 shows a sectional view of the combination of the present invention with the conventional toilet.

The non flush toilet 10 of the present invention is provided with an excrement bag B which is made of a paper, cloth, cotton, plastic, or light decomposable material and is attached to the toilet seat for collecting the excrement.

As shown in FIGS. 1–4, the present invention comprises a machine housing 20, a breaking and separating mechanism 30, a power driving device 40, and a conveyer device 50. The housing 20 is provided at the top thereof with an inlet tube 21 and an exhaust tube 22. The inlet tube 21 is connected with the breaking and separating mechanism 30 and the non flush toilet 10. The excrement is guided into the breaking and separating mechanism 30 via the inlet tube 21. One of the vertical sides of the housing 20 is provided with an input port 23.

Figure 2:
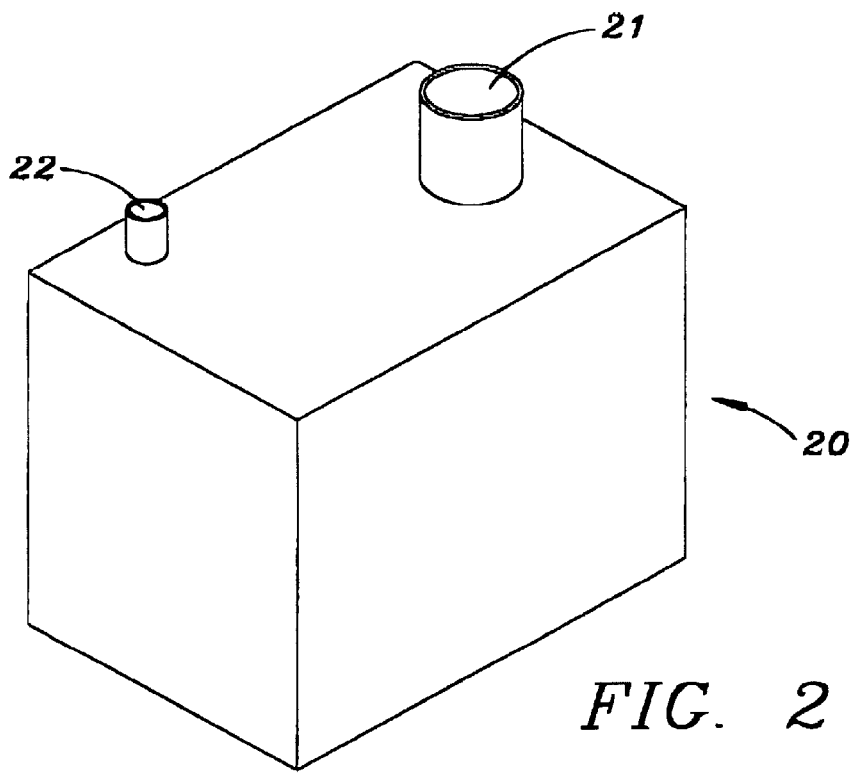
FIG. 2 shows a perspective view of the present invention.
Figure 3:
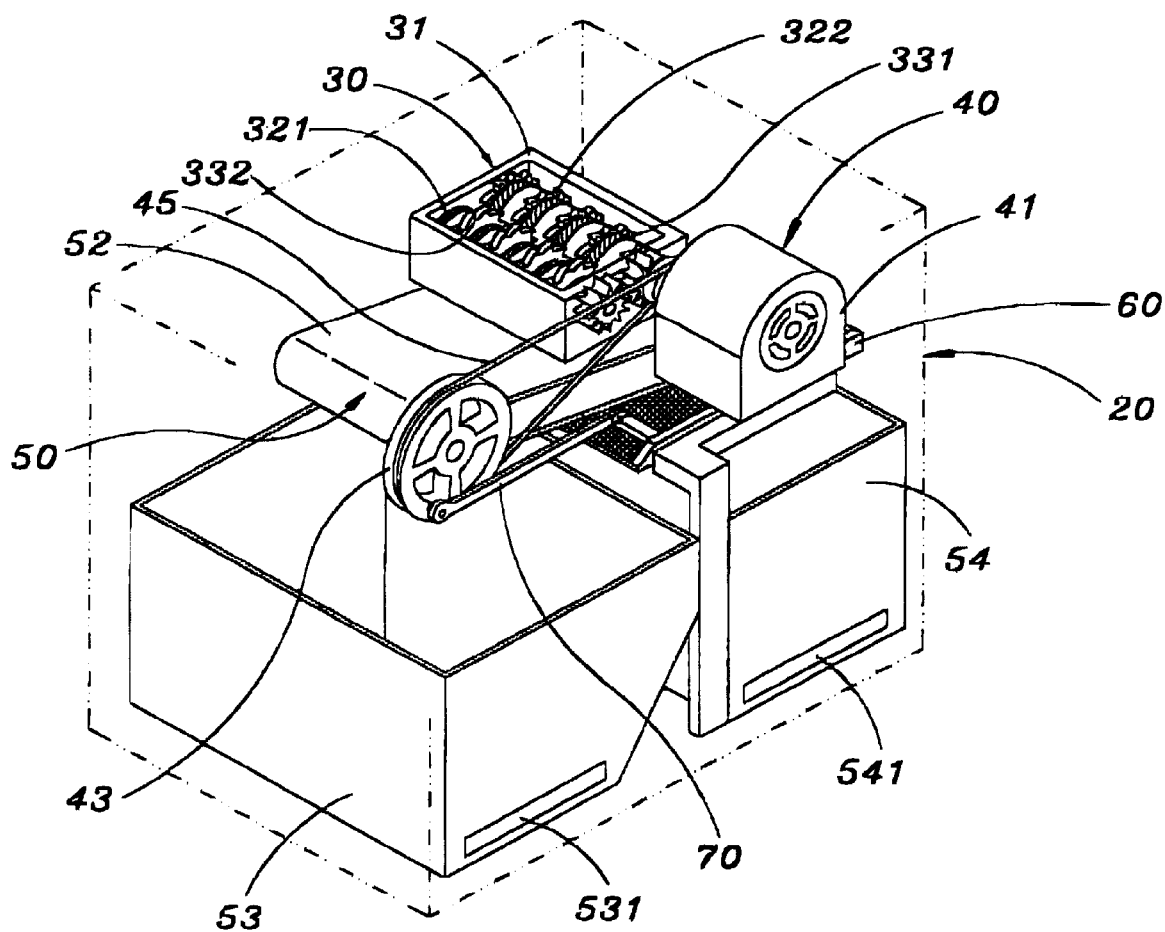
FIG. 3 shows another perspective view of the present invention.
Figure 4:
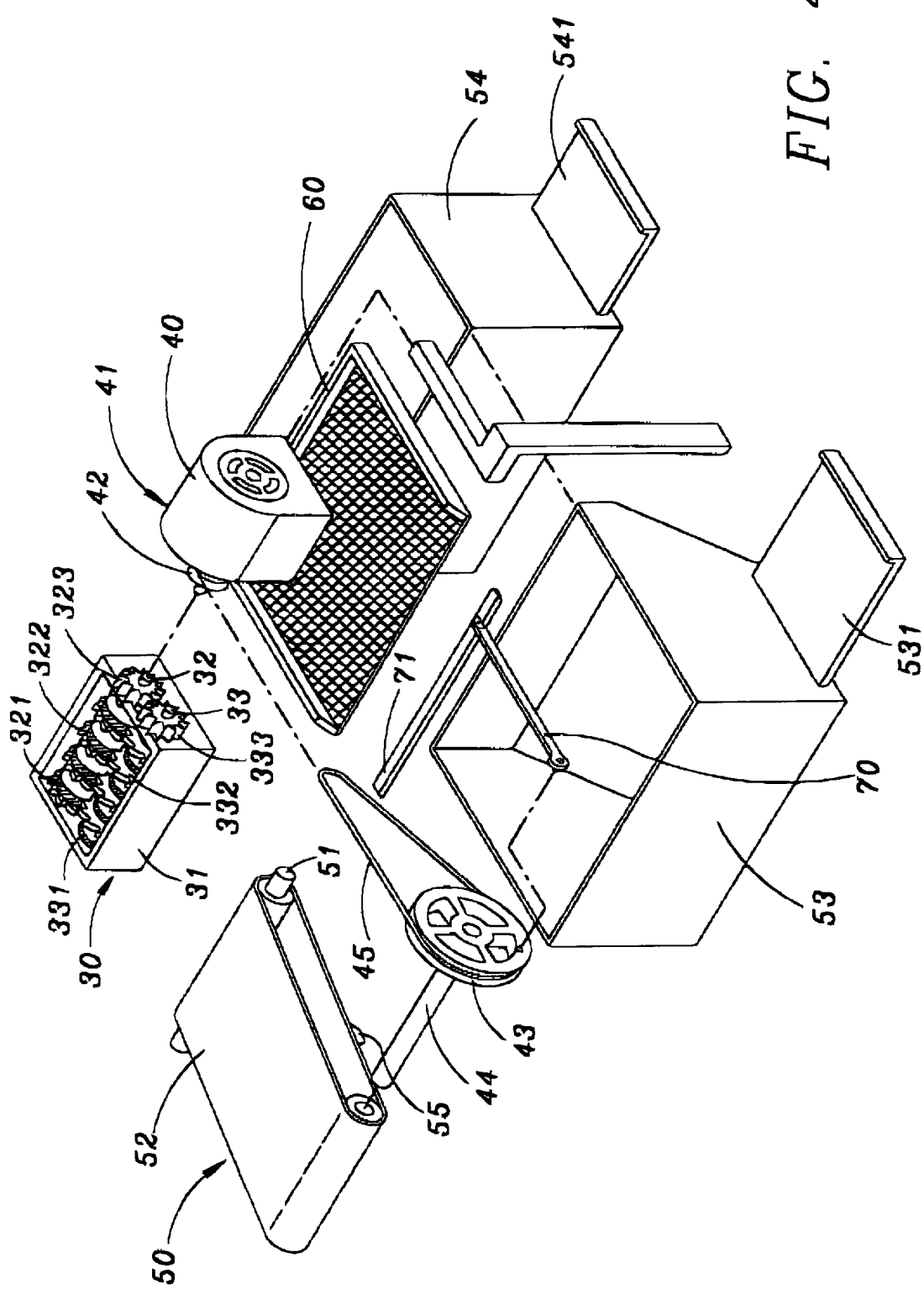
FIG. 4 shows an exploded view of the present invention.

As shown in FIGS. 2–4, the breaking and separating mechanism 30 comprises a square frame 31 and two transmission shafts 32 and 33 which are fastened pivotally with the square frame 31. A plurality of rollers 321 and 331 are mounted on the two transmission shafts 32 and 33 such that a plurality of cutting disks 322 and 332 is mounted between the rollers 321 and 331. The two transmission shafts 32 and 33 are provided at the free end thereof with two transmission gears 323 and 333, which are engaged with each other to enable the rollers 321, 331 and the cutting disks 322, 332 to turn simultaneously in the reverse direction.

As shown in FIGS. 3 and 4, the power driving device 40 is mounted in the machine housing 20 and is formed of a motor 41, a drive belted wheel 42, a driven belted wheel 43, and a conveyer drive shaft 44 capable of turning coaxially with the driven belted wheel 43. The drive belted wheel 42 is mounted on the power output end of the motor 41. The drive belted wheel 42 and the driven belted wheel 43 are linked by a transmission belt 45 for transmitting the power of the motor 41 to the conveyer drive shaft 44 in a decelerating manner. The power output end of the motor 41 is connected with the transmission shaft 32 or 33 of the breaking and separating mechanism 30 for imparting the power of the motor 41 to the breaking and separating mechanism 30.

As shown in FIGS. 1–4, the conveyer device 50 comprises a conveyer driven shaft 51 fastened pivotally in the interior of the machine housing 10, a conveyer belt 52, a storage box 53, and a water collection box 54. The conveyer belt 52 is arranged obliquely between the conveyer drive shaft 44 of the power drive device 40 and the conveyer driven shaft 51 such that the conveyer belt 52 is driven by the conveyer drive shaft 44. The storage box 53 is deposed under the conveyer drive shaft 44. The conveyer belt 52 is provided thereunder with an arresting plate 55 which is intended to remove the solid excrement which is attached to the conveyer belt 52. The solid excrement so removed from the conveyer belt 52 is then deposited in the storage box 53. The storage box 53 is provided at the bottom thereof with an opening having a movable valve plate 531 and in the outer wall thereof with a heater 532, as shown in FIG. 1. The water collection box 54 is located under the breaking and separating mechanism 30 such that the moisture in the excrement is deposited in the water collection box 54 in view of the inclination of the conveyer belt 52. The water collection box 54 contains a filtration material "S", such as sand, and is provided at the bottom thereof with an opening which has a movable gate 541, and a water outlet 542 via which the filtered water is discharged.

The excrement bag "B" containing the excrement is guided into the breaking and separating mechanism 30 such that the excrement bag "B" and its excrement contents are cut into pieces by the cutting disks 322 and 332, and that water is collected in the water collection box 54. The excrement pieces are carried away by the conveyer belt 52 and are then deposited in the storage box 53. The moisture of the excrement pieces is removed by the heater 532 of the storage box 53. The dehydrated excrement pieces are collected for use as an organic fertilizer. The dehydrated excrement is removed from the storage box 53 via the movable gate 531. The filtration material "S" must be replaced periodically to ensure that the water is effectively filtered.

It is very likely that the particles of the excrement may be trapped in the filtration material "S", and that the bacteria carried by the excrement particles grow in the filtration material. The growth of bacteria can undermine the filtration effectiveness of the filtration material "S". In order to overcome such a problem arising from the growth of bacteria, the water collection box 54 is provided with a metal filtration screen 60 and a connection rod 70. The metal filtration screen 60 is slantingly disposed such that the metal filtration screen 60 faces the storage box 53. The metal filtration screen 60 is intended to trap the particles which are contained in the water. The connection rod 70 is fastened pivotally at one end thereof with the driven belted wheel 43 and is provided at other end thereof with a scraping plate 71 in contact with the metal filtration screen 60. As the driven belted wheel 43 is actuated to turn, the connection rod 70 is actuated such that the excrement particles trapped on the metal filtration screen 60 are scraped off to deposit in the storage box 53.

The embodiment of the present invention described above is to be regarded in all respects as being merely illustrative and not restrictive. Accordingly, the present invention may be embodied in other specific form without deviating from the spirit thereof. The present invention is therefore to be limited only by the scopes of the following appended claims.

What is claimed is:

1. An excrement treating machine of a non-flushing toilet comprising a housing, a breaking and separating mechanism, a power driving device, and a conveyer device; wherein said housing is provided at a top thereof with an inlet tube and an exhaust tube whereby said inlet tube is connected with said breaking and separating mechanism and the non-flushing toilet for guiding excrement into said breaking and separating mechanism from the non-flushing toilet, said housing being further provided in one of vertical sides thereof with an input port; wherein said breaking and separating mechanism comprises a square frame, two transmission shafts fastened pivotally with said square frame, a plurality of rollers mounted on said two transmission shafts, and a plurality of cutting disks mounted between said rollers whereby said two transmission shafts are provided at a free end thereof with two transmission gears which are engaged with each other to enable said rollers and said cutting disks to turn simultaneously in a reverse direction; wherein said power driving device is mounted in said housing and is formed of a motor, a drive belted wheel, a driven belted wheel, and a conveyer drive shaft capable of turning coaxially with said driven belted wheel whereby said drive belted wheel is mounted on a power output end of said motor such that said drive belted wheel and said driven belted wheel are linked by a transmission belt for transmitting power of said motor to said conveyer drive shaft in a decelerating manner, said motor being connected at a power output end thereof with one of said two transmission shafts of said breaking and separating mechanism for imparting power of said motor to said breaking and separating mechanism; and wherein said conveyer device comprises a conveyer driven shaft fastened pivotally in said housing, a conveyer belt, a storage box, and a water collection box whereby said conveyer belt is arranged obliquely between said conveyer drive shaft of said power drive device and said conveyer driven shaft such that said conveyer belt is driven by said conveyer drive shaft, and that said conveyer belt is provided thereunder with an arresting plate used to remove solid excrement, which is attached to said conveyer belt, whereby said storage box is used to store solid excrement removed from said conveyer belt by said arresting plate and is provided at a bottom thereof with an opening having a movable vale plate, and in an outer wall thereof with a heater whereby said water collection box is located under said breaking and separating mechanism for collecting moisture in the excrement and is formed of a filtration material, a movable gate, and a water outlet for discharging the filtered water.

2. The excrement treating machine of a non-flushing toilet as defined in claim 1, wherein said water collection box is provided with a metal filtration screen and a connection rod whereby said metal filtration screen is slantingly disposed such that said metal filtration screen faces said storage box whereby said connection rod is fastened pivotally at one end thereof with said driven belted wheel and is provided at other end thereof with a scraping plate in contact with said metal filtration screen.

\* \* \* \* \*